United States Patent [19]

Briatte

[11] Patent Number: 5,136,288
[45] Date of Patent: Aug. 4, 1992

[54] METHOD AND INSTALLATION FOR PROVIDING ALIGNMENT GUIDANCE TO AN AIRCRAFT IN THE APPROACH STAGE

[75] Inventor: Louis M. Briatte, Paris, France
[73] Assignee: Britec, France
[21] Appl. No.: 588,222
[22] Filed: Sep. 26, 1990

[30] Foreign Application Priority Data

Oct. 2, 1989 [FR] France .................. 89 12859

[51] Int. Cl.$^5$ ............................... B64F 1/18
[52] U.S. Cl. .................. 340/955; 340/953; 340/954
[58] Field of Search .......... 340/947, 952, 953, 954, 340/955, 956; 342/33; 364/28; 73/178 T

[56] References Cited

U.S. PATENT DOCUMENTS

| | | | |
|---|---|---|---|
| 2,968,023 | 1/1961 | Ferguson et al. | 340/955 |
| 3,204,218 | 8/1965 | Fillery et al. | |
| 3,447,129 | 5/1969 | Birmingham et al. | 340/955 |
| 3,488,558 | 1/1970 | Grafton | 340/953 |
| 3,531,765 | 9/1970 | Christianson et al. | |
| 3,885,876 | 5/1975 | Konopka | 340/955 |
| 4,170,767 | 10/1979 | Tanner | 340/955 |

FOREIGN PATENT DOCUMENTS

| | | |
|---|---|---|
| 740061 | 11/1955 | United Kingdom . |
| 793867 | 4/1958 | United Kingdom . |
| 2202980 | 3/1987 | United Kingdom . |

Primary Examiner—Jin F. Ng
Assistant Examiner—Brent A. Swarthout
Attorney, Agent, or Firm—Sughrue, Mion, Zinn, Macpeak & Seas

[57] ABSTRACT

The invention relates to a method and an installation for providing an aircraft with alignment guidance during the approach stage. At least three flashing lights are disposed on either side of the runway and directed towards an approaching aircraft. The beam directions and the timing of the light flashes are such that the pilot of an aircraft lying on the axis of the runway sees the two lights closest to the runway flash simultaneously, whereas the pilot of an aircraft that is too far to one side or the other of the axis of the runway sees a series of light flashes that appear to be running towards the axis of the runway.

12 Claims, 2 Drawing Sheets ical planes disposed on either side of the runway 3 in which the pilot of the aircraft 6 can see only the light from the two lamps 7a which are closest to the runway

METHOD AND INSTALLATION FOR PROVIDING ALIGNMENT GUIDANCE TO AN AIRCRAFT IN THE APPROACH STAGE

The present invention relates to the field of air navigation.

It relates more particularly to a method of providing an aircraft with alignment guidance during the visual approach stage and prior to landing.

BACKGROUND OF THE INVENTION

The stage prior to an aircraft landing is one of the most difficult stages of a flight plan and it requires sustained attention on the part of the aircraft pilot since it is necessary to keep track of a very large number of parameters, some of which are capable of varying rapidly. The aircraft must be maintained in a vertical plane containing the axis of the runway, regardless of wind speed and force. The pilot takes account of the image of the landing runway as seen visually, which image changes quickly during the approach stage and may be incomplete in misty weather.

The object of the present invention is to provide a method of guiding an aircraft during the visual approach stage giving the pilot an immediate visual indication that the aircraft is in the vertical plane containing the axis of the runway or if the aircraft is to the left or right of this plane.

SUMMARY OF THE INVENTION

This object is achieved by the invention by virtue of a method wherein:

a set of at least three flashing lights is disposed on either side of a landing runway, said lights being regularly distributed along a horizontal line perpendicular to said runway and being designed to shine in a direction substantially parallel to the ideal approach trajectory for the aircraft in such a manner that in each set, the light closet to the runway is visible in a first air space extending on either side of the vertical plans containing the axis of the runway, and in such a manner that the other lights of said set are visible only in a second air space extending to the same side of said vertical plane as occupied by said set; and said lights are caused to emit series of flashes in such a manner that the two lights situated on either side of the runway and closest thereto flash simultaneously, and in such a manner that the lights of each set flash one after another starting with the light which is furthest from the runway and finishing with the light which is closest to the runway.

This method, which does not require any special installation on board the aircraft, informs the pilot immediately if the aircraft is lying on the axis of the runway, in which case the pilot can see only two lights flashing simultaneously, or if the aircraft is to one side or the other of said axis. For example, when the aircraft is to the left of the vertical plane containing the axis of the runway, the pilot sees the lights in the set situated to the left of this plane flashing in succession from the light furthest from the runway towards the light closest to the runway, with the flashes giving the impression of moving to the right and encouraging the pilot to move to the right as well.

The light emitted by the lights may be visible light, but it may advantageously be infrared light, thereby enabling the method to be used in misty weather, providing the pilot is provided with appropriate imaging means.

Advantageously, the light flash rate is adjustable and the spacing between the lights is also adjustable. The same applies to the intensity of the flashes emitted.

Advantageously, the beam direction of the lights relative to the horizontal can be modified.

The present ivention also relates to an installation for implementing the method, the installation comprising two sets of at least three lamps each, the sets being disposed on either side of the landing runway, and a switch box powered by a source of electricity and electrically connected to the lamps in such a manner as to control the timing of the light flashes emitted by said lamps.

Advantageously, the lamps of a set are mounted on a shaft which is stabilized by a gyroscope.

BRIEF DESCRIPTION OF THE DRAWINGS

An embodiment of the invention is described by way of example with reference to the accompanying drawings, in which.

DETAILED DESCRIPTION

Figure 1:
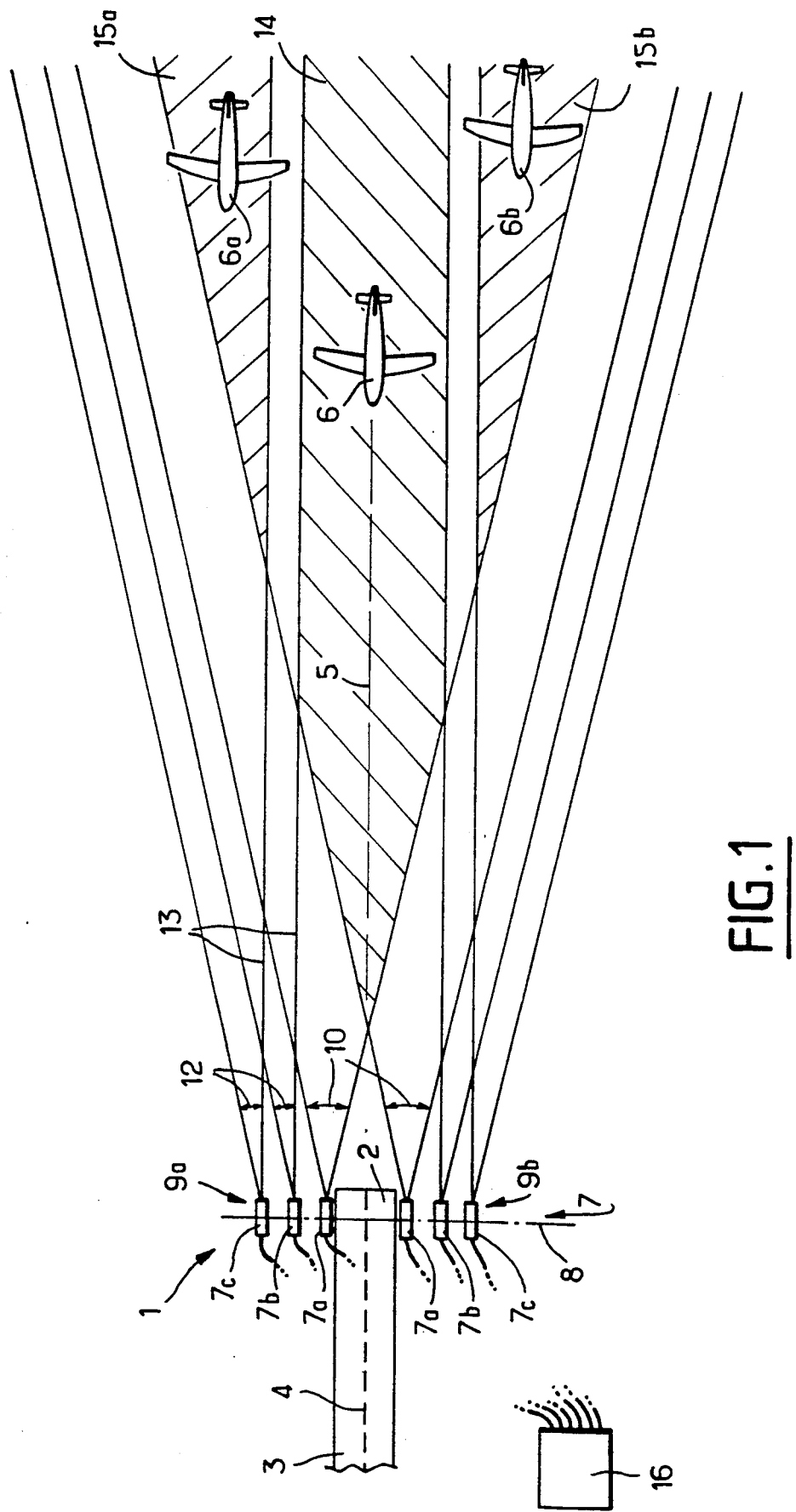
FIG. 1 is a plan view of an installation for providing an aircraft with alignment guidance.

FIG. 1 is a plan view of an installation 1 for providing an aircraft with alignment guidance, the installation being disposed close to the end 2 of a landing runway 3. The vertical plane containing the axis 4 of the runway 3 is referenced 5.

In accordance with the invention, the installation 1 for providing alignment guidance to an aircraft 6 shown in FIG. 1 in its approach stage and on the axis 4 of the runway 3, is constituted by lamps or lights 7 disposed on a horizontal line 8 which is perpendicular to the axis 4 of the runway 3. The lamps 7 are split into two sets 9a and 9b disposed on either side of the runway 3, with each set having at least three lamps 7a, 7b, and 7c. The lamp 7a is adjacent to the runway 3, and the lamps 7b and 7c are regularly spaced apart along the line 8 and going away from the runway 3.

The lamps 7 are disposed so as to be capable of shining in a direction substantially parallel to the ideal approach trajectory for the aircraft 6.

The light beams 10 emitted by the lamps 7a adjacent to the runway 3 are conical in shape with the cone axes being parallel to the ideal approach trajectory for the aircraft 6. In contrast, the light beams 12 emitted by each of the lamps 7b and 7c further from the runway 3 are in the form of half-cones delimited by respective planes 13 parallel to the vertical plane 5 including the axis 4 of the runway, with each beam extending from the corresponding plane 13 away from the vertical plane 5.

By having the lamps 7 in this disposition, a first air space 14 is provided with an axis 4 of the landing runway, and which first air space is delimited by two verti- 3. On either side of this first air space 14, there are respective second air spaces 15a and 15b in each of which the pilot of an aircraft 6a or 6b can see not only the light emitted by both lamps 7a, but also the light emitted by the lamps 7b and 7c in that one of the sets of lamps 9a or 9b which is offset in the same direction as the aircraft relative to the vertical plane 5. The air spaces 14, 15a, and 15b are represented in FIG. 1 by shading.

The lamps 7 emit flashes of light in succession in a predetermined sequence. To do this they are connected to a switch box 16 which powers each of the lamps in the sets 9a and 9b in the following order during an operating cycle: the outer lamps 7c, then the intermediate lamps 7b, and finally the lamps 7a adjacent to the runway 3.

Figure 2:
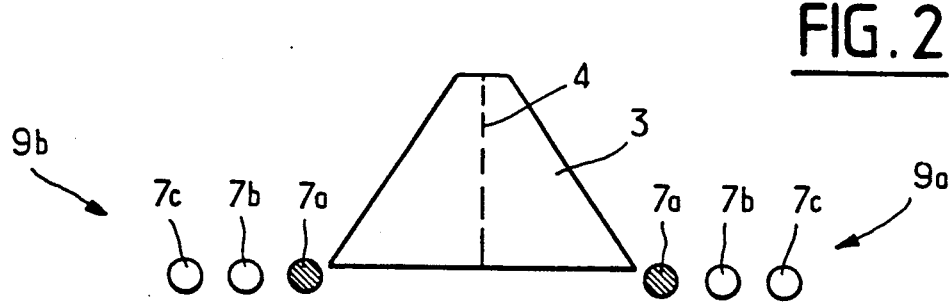
FIG. 2 represents the image seen by the pilot of an aircraft which is in alignment with the axis of the landing runway.

The lamps 7a closest to the axis of the runway thus flash simultaneously and the pilot of an aircraft 6 lying in the first air space 14 sees two lights flashing simultaneously as represented in FIG. 2.

Figure 3:
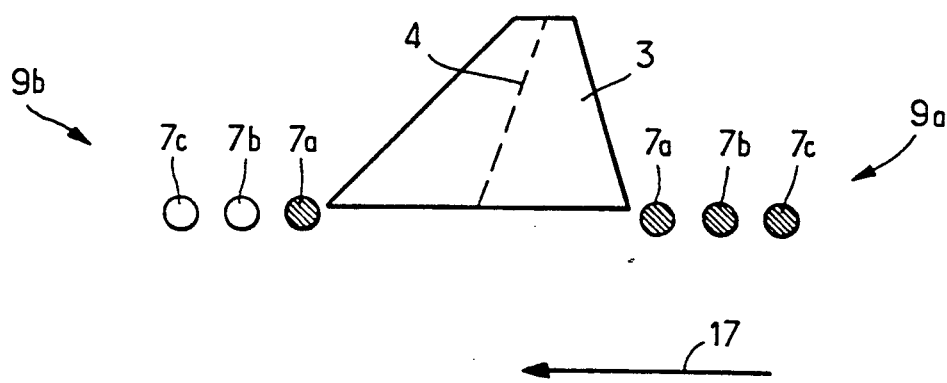
FIG. 3 represents the image seen by the pilot when the aircraft is to the right of the axis of the runway.

However, the pilot of an aircraft 6a in air space 15a, i.e. to far to the right of the vertical plane 5 containing the axis 4 of the runway 3, sees lights flashing successively in the direction represented by arrow 17 going from the outside right position relative to the runway 3 towards the axis 4 of the runway 3, as can be seen in FIG. 3. These flashes of light are emitted by the lamps 7c, 7b, and 7a in lamp group 9a.

Figure 4:
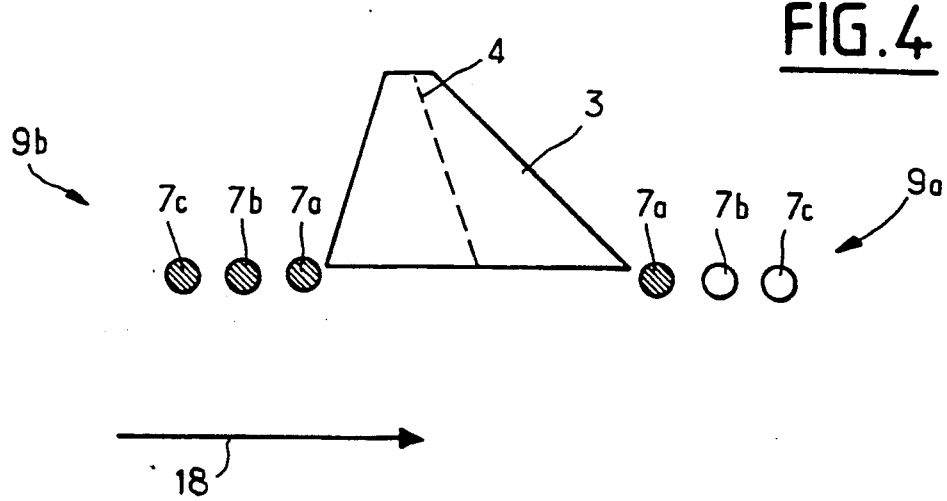
FIG. 4 represents the image seen by the pilot when the aircraft is to the left of the runway axis.

FIG. 4 shows the direction 18 of successive flashes emitted by the lamps 7c, 7b, and 7a in lamp group 9b as seen by the pilot of an aircraft 6b which is too far to the left of the vertical plane 5.

The power of the flashes emitted by the lamps 7 may be adjusted as a function of weather conditions. Similarly, the lamps 7 may be mounted on a stabilized shaft enabling the beam direction of the light relative to the horizontal to be modified, and the spacing between adjacent lamps may also be modified. The flashing rate is also adjustable.

When the installation is used on an airfield that is already provided with light beacon equipment, the installation may be integrated in the beacon equipment either at the level of the lights for identifying the threshold of the runway, in which case these lights are either replaced by the lights 7a or the lights 7a are added thereto, or else they may be integrated at the level of existing side bar lights which are replaced completely or in part by the set of lights of the installation of the invention.

The same installation may be used for guiding a helicopter approaching a heliport or an arbitrary landing zone provided therefor. In this case, the sets of lamps 9a and 9b may be placed on either side of an optical system which defines the landing trajectory in elevation.

In conventional manner, the lamps 7 comprises a light source, a deflector, diaphragms, and lenses. The lamps 7b and 7c also include respective masks for masking a portion of the light that would normally be emitted by each of them. The light source may emit visible light or infrared light.

The use of the installation described above does not require any new equipment on board an aircraft, except when the light emitted by the lamps is in the infrared. In addition, this novel method of guiding aircraft during the approach stage is very accurate. When the lamps 7 are 10 meters apart, for example, it is possible to see apparent running direction of the flashes emitted by the lamps 7a, 7b, and 7c in a group of lamps 9a or 9b from more than 5 kiliometers away. The angular width of the light beams 10 may be about 30° and the angular width of the light beam 12 may be about 15°. This width is advantageously adjustable.

In the above description, each set of lamps 9a or 9b comprises only three lamps 7a, 7b, and 7c. The number of lamps 7 in each group may naturally be greater than three.

I claim:

1. A method for providing an aircraft with alignment guidance during the visual approach stage and prior to landing, comprising the steps of:

disposing first and second light sets, each of which has at least three flashing lights, along opposite sides of a landing runway, said lights being regularly distributed along a horizontal line perpendicular to said runway, shining said light sets in a direction substantially parallel to an ideal approach trajectory for the aircraft in such a manner that an innermost light from each set closest to the runway is the only light visible by the pilot when the aircraft is in a first air space extending on either side of the vertical plane containing the axis of the runway, and in such a manner that outer lights of said first and second sets are visible only in second and third air spaces, respectively, said second and third air spaces extending along opposite sides of the runway and not including the runway; and emitting series of flashes from said lights in each set in such a manner that the innermost from each set, flash simultaneously, and the lights of each set flash one after another, starting with a light which is furthest from the runway and finishing with a light which is closest to the runway, such that only simultaneously flashing lights are visible to a correctly aligned aircraft and successively flashing lights along one side of the runway are only visible to an incorrectly aligned aircraft.

2. A method according to claim 1, wherein the lights emit visible light.

3. A method according to claim 1, wherein the lights emit infrared light.

4. A method according to claim 1, wherein the rate at which flashes of light are emitted by the lights is adjustable.

5. A method according to claim 1, wherein the spacing between the lights is adjustable.

6. A method according to claim 1, wherein the beam direction of the lights relative to the horizontal can be modified.

7. An apparatus for providing an aircraft with alignment guidance during the visual approach stage and prior to landing, comprising:

first and second light sets, each of which has at least three flashing lights, disposed along opposite sides of a runway, said lights being regularly distributed along a horizontal line perpendicular to said runway, each of said sets including an innermost light closest to the runway and outer lights, wherein said first and second light sets are projected in a direction substantially parallel to an ideal aircraft approach trajectory, said innermost light from each set being the only light visible to an aircraft in a first air space which includes the runway, said outer lights in the first and second sets being visible only to an aircraft in second and third air spaces, respectively, said second and third air spaces extending along opposite sides of the runway without including the runway; and means for flashing said innermost lights simultaneously and the lights within each set successively, said innermost and outer lights being oriented and flashed in such a manner that an aircraft in the first air space only views the innermost lights flashing simultaneously and an aircraft in the second and third air spaces views the outer lights from the first and second sets respectively, flashing successively starting with an outermost light in each set and finishing with the innermost light in each set.

8. An apparatus as in claim 7, comprising two sets of at least three lamps each, the sets being disposed on either side of the landing runway, and a switch box powered by a source of electricity and electrically connected to the lamps in such a manner as to control the timing of the light flashes emitted by said lamps.

9. An apparatus according to claim 8, wherein the lamps are mounted on a stabilized shaft.

10. The apparatus of claim 7, wherein light beams from said innermost lights are conical in shape and light beams from remaining lights are half-cone shaped.

11. The apparatus of claim 7, wherein light beams from each of the innermost lights form an angular width of about 30° and light beams from each of the remaining lights form an angular width of about 15°.

12. The apparatus of claim 7, wherein a pilot sees both innermost lights and the remaining lights of one set when the aircraft is positioned within said second or third air spaces.

* * * * *